United States Patent [19]

Eisenbraun et al.

[11] Patent Number: 4,956,451

[45] Date of Patent: Sep. 11, 1990

[54] COMPOSITIONS FOR PRODUCTION OF ELECTRONIC COATINGS

[75] Inventors: Allan A. Eisenbraun; Wesley C. Blocker, both of Baton Rouge, La.

[73] Assignee: Ethyl Corporation, Richmond, Va.

[21] Appl. No.: 255,260

[22] Filed: Oct. 11, 1988

[51] Int. Cl.$^5$ .................... C08G 69/26; C08G 12/00; B05D 3/02; B05D 3/12

[52] U.S. Cl. .................... 528/353; 528/176; 528/188; 528/229; 427/240; 427/346; 427/384; 427/385.5

[58] Field of Search ............ 528/353, 176, 188, 229; 427/240, 384, 385.5, 346

[56] References Cited

U.S. PATENT DOCUMENTS 4,736,015  4/1988  Rabilloud et al. .................. 528/353
4,760,126  7/1988  Numata et al. .................... 528/353

FOREIGN PATENT DOCUMENTS 1062435  3/1967  United Kingdom ............... 528/353

*Primary Examiner*—Morton Foelak
*Assistant Examiner*—P. Hampton Hightowe
*Attorney, Agent, or Firm*—John F. Sieberth; Richard J. Hammond

[57] ABSTRACT

In humid atmospheres (e.g., 40% relative humidity or above) solutions of 2,2-bis(3,4-dicarboxyphenyl)hexafluoropropane dianhydride/2,2-bis[4-(aminophenoxy)phenyl]hexafluoropropane polyimides tend to be unstable in the sense that during spin coating operations undesirable precipitate formation occurs on the rotating surface of the water. The result is the formation of unacceptable coatings due to their irregularity and lack of uniformity. Described are compositions especially adapted for use in spin coating wafers of semiconductive materials, which comprise solutions of these polyimide polymers in a solvent containing at least 10% of a cycloaliphatic ketone (e.g., cyclohexanone) or mixture of cycloaliphatic ketones, such that the solution (a) contains on a weight basis from about 5% to about 50% of the polyimide, and (b) does not undergo precipitate formation during spin coating in an atmosphere of up to at least about 55% relative humidity.

20 Claims, No Drawings

COMPOSITIONS FOR PRODUCTION OF ELECTRONIC COATINGS

BACKGROUND

Polyimides derived from 2,2-bis(3,4-dicarboxyphenyl)hexafluoropropane dianhydride and 2,2-bis[4-(aminophenoxy)phenyl]hexafluoropropane are useful, inter alia, for the production of electronic coatings on semiconductor wafers, such as polysilicon wafers. In order to apply solutions or such polyimides to the wafers spin coating procedures are used, and in these operations purity, integrity, and uniformity of the resultant polyimide coating are essential.

Unfortunately it has been discovered that in humid atmospheres (e.g., 40% relative humidity or above) solutions of such polyimides in some commonly used solvents (e.g., N-methylpyrrolidone) tend to be unstable in the sense that during spin coating operations undesirable precipitate formation occurs on the rotating surface of the wafer. The result is that the coating loses adhesion to the wafer and flies off of it during spin coating.

The need thus exists for solutions of 2,2-bis(3,4-dicarboxyphenyl)hexafluoropropane dianhydride/2,2-bis[4-(aminophenoxy)phenyl]hexafluoropropane polyimides which do not undergo undesirable precipitate formation on rotating wafer surfaces when used in spin coating operations even if conducted under conditions of 55% relative humidity. This invention is deemed to fulfill this need in an effective and efficient manner.

THE INVENTION

In accordance with this invention there is provided a partially fluorinated polyimide composition especially adapted for use in spin coating wafers of semiconductive materials. Such composition comprises a solution of (i) a 2,2-bis(3,4-dicarboxyphenyl)hexafluoropropane dianhydride/2,2-bis[4-(aminophenoxy)phenyl]hexafluoropropane polyimide polymer having an inherent viscosity in the range of about 0.05 to about 1.5 dL/g—as measured in N-methylpyrrolidone at room temperature (25° C.) at a concentration of 0.5 g/dL—in (ii) a solvent containing at least 10% by weight of a cycloaliphatic ketone or a mixture of cycloaliphatic ketones, such that the solution (a) contains on a weight basis from about 5% to about 50% of such polyimide and (b) does not undergo precipitate formation during spin coating in an atmosphere of up to at least about 55% relative humidity. These solutions preferably contain on a weight basis from about 10% to about 35% of such polyimide. It is also preferable that the inherent viscosity of the polyimide (as measured at a concentration of 0.5 g/dL in N-methylpyrrolidone at room temperature) fall in the range of about 0.1 to about 0.9 dL/g.

Preferably, the polyimide is produced in the cycloaliphatic ketone solvent (with or without a co-solvent) although if desired, it may be formed in a different reaction medium, recovered therefrom, and then dissolved in the cycloaliphatic ketone solvent (with or without a co-solvent). Alternatively, the polyimide may be formed in the cycloaliphatic ketone solvent and one or more co-solvents may then be added thereto. As is well known, polyimides are formed by reacting essentially equimolar proportions of a primary diamine with a tetracarboxylic acid or derivative thereof, preferably the dianhydride of the tetracarboxylic acid. Thus in the practice of this invention it is preferred to produce the solutions by reacting in an appropriate reaction solution an essentially equimolar mixture of 2,2-bis(3,4-dicarboxyphenyl)hexafluoropropane dianhydride and a 2,2-bis[4-(aminophenoxy)phenyl]hexafluoropropane, e.g., 2,2-bis[4-(3-aminophenoxy)phenyl]hexafluoropropane, a mixture of 2,2-bis[4-(3-aminophenoxy)phenyl]hexafluoropropane and 2,2-bis[4'(4-aminophenoxy)phenyl]hexafluoropropane, or most preferably, 2,2-bis[4-(4-aminophenoxy)phenyl]hexafluoropropane.

At some stage during or after the reaction, the solution should be heated to a suitably high temperature (usually in the vicinity of 140° C. or above) in order to convert any intermediate polyamic acid into polyimide.

As noted above, the solvent used contains at least 10% of a cycloaliphatic ketone or mixture of cycloaliphatic ketones. Typical cycloaliphatic ketones which may used include cyclohexanone
2-methylcyclohexanone
3-methylcyclohexanone
4-methylcyclohexanone
2,5-dimethylcyclopentanone
2,6-dimethylcyclohexanone
cycloheptanone
cyclooctanone
4-ethylcyclohexanone
cyclononanone
cyclodecanone
2-cyclopentenone
3,5-dimethyl-2-cyclohexen-1-one
3-ethoxy-2-cyclohexen-1-one
isophorone
1-decalone
2-decalone and the like, including mixtures of two or more such compounds. Cycloparaffinic ketones are preferred because of the absence of ring unsaturation and their lower cost, cyclohexanone being particularly preferred. Other solvents may be copresent provided they do not, in the concentrations employed, adversely affect the stability and desirable spin coating characteristics of the resultant solution when used in an atmosphere of up to 55% relative humidity. Generally speaking, other solvents which may be present in appropriate proportions include aprotic solvents and aromatic hydrocarbons, preferably (but not necessarily) having boiling points of at least 110° C.

Examples of such co-solvents include

N,N-dimethylformamide
N,N-dimethylacetamide
N-methylpyrrolidone
dimethylsulfoxide
tetrahydrofuran
diethylene glycol dimethyl ether
triethylene glycol dimethyl ether
dimethoxyethane
acetone
methylethylketone
toluene
xylene
1,2,3,4-tetramethylbenzene
1,2,3,5-tetramethylbenzene
1,2-diethylbenzene
1,3-diethylbenzene
1,4-diethylbenzene
3,5-diethyltoluene n-butylbenzene
3-propyltoluene
4-propyltoluene
tetrahydronaphthalene
and the like, including mixtures of two or more such solvents. If the cycloaliphatic ketone is a low melting solid at room temperature, it should be mixed with a liquid cycloaliphatic ketone or some other suitable liquid solvent such that the resultant mixture is a liquid at somewhat below room temperature.

Needless to say, the reactants and solvent(s) used in forming the compositions of this invention should have sufficiently high purities to satisfy the requirements of electronic coatings. Thus the solids are preferably recrystallized from highly pure solvents and the liquids are preferably purified by use of distillation or other purification techniques.

In another of its forms, this invention provides a method of forming a coating upon a planar substrate such as a semiconductor wafer. In this method a suitable quantity of a composition of this invention is applied to the central region of the planar surface and the substrate is rotated at a speed sufficient through centrifugal effect to cause the composition to flow outwardly to the perimeter of the surface and in so doing form a substantially uniform liquid coating thereon. Ordinarily rotational speeds in the range of about 1,000 to about 10,000 rpm (and preferably about 1,000 to about 5,000 rpm) for periods in the range of about 10 seconds to about 5 minutes are most useful, although departures from either or both of these ranges may be employed where the circumstances warrant or justify such departures. Generally speaking, the higher the rotational speed, the thinner the coating. Once the liquid coating has been formed over the planar surface the coated substrate is heated to an elevated temperature normally in the range of about 80 to about 130° C. to dry the coating without destroying its integrity. Thereafter the dried coating is heated to a still higher temperature (e.g., in the range of about 200° C. to about 450° C.) to bake the coating. It has been found that if the coated substrate is heated to a temperature of at least about 350° C., the solvent resistance of the coating is improved.

A wide variety of substrates may be coated in this manner, including metals, ceramics, high temperature resistant polymers, intermetallic compounds and compound semiconductors (e.g., GaAs, $GaAs_xP_{1-x}$, etc.), and the like. Usually, but not necessarily, the substrate will be in the form of a disc or wafer.

The practice and advantages of this invention are illustrated in the following examples. Examples 1-3 typify procedures that may be used to produce the compositions of this invention. The manner by which the compositions of this invention may be used in a spin coating operation is illustrated in Example 4.

EXAMPLE 1

2,2-Bis(3,4-dicarboxyphenyl)hexafluoropropane dianhydride/2,2-bis[4-(4-aminophenoxy)phenyl]hexafluoropropane polyimide was produced as follows: 2,2-Bis(3,4-dicarboxyphenyl)hexafluoropropane dianhydride (21.302 g) was added to a stirred solution of 24.926 g of 2,2-bis[4-(4-aminophenoxy)phenyl]hexafluoropropane in 112.04 g of N-methylpyrrolidone (NMP) heated to 82° C. Stirring was effected by means of a double spiral agitator, and the system was maintained under a dry nitrogen atmosphere. An additional 19.74 g of NMP was used to rinse the anhydride into the diamine solution. The reaction mixture was slowly heated to 199° C. over a period of 2.5 hours with stirring, and during this time 8.4 mL (8.77 g) of a mixture of water and NMP distilled out of the reaction vessel. The reaction mixture—a viscous solution of the polyimide in NMP—was allowed to cool to room temperature and found to have a solids content of 26.6% as compared to a calculated value of 26.3%. A 23.08 g portion of this solution was diluted with 100.02 g of NMP and one-half of the resultant diluted solution was added slowly to 500 mL of deionized water while continuously agitating the system in a Waring blender. The solid polyimide polymer which was precipitated out of solution was recovered by filtration and slowly added to another 500 mL of deionized water continuously being agitated in a Waring blender. The so-washed polymer was recovered by filtration, and this waterwashing and filtration procedure was repeated once again with another 500 mL quantity of deionized water. The solid polymer was then dried at 55° C. under reduced pressure (0.1 mm Hg). This polyimide was found to have an inherent viscosity of 0.78 dL/g as measured in N-methylpyrrolidone at room temperature (25° C.) at a polyimide concentration of 0.5 gram per deciliter. One solution of this invention (17% solids) was formed from this solid polymer by dissolving 4.04 g of the polyimide in a mixture of 18.245 g of cyclohexanone and 2.02 g of N-methylpyrrolidone, both of which had been dried over molecular sieves, thoroughly stirring the solution, and filtering it through a 0.2 micron filter using nitrogen pressure. Using similar procedures another solution of this invention (16% solids) was formed from another quantity of the polyimide polymer which which was isolated from the viscous reaction solution by the water wash-filtration technique described above. In this case 2.86 g of the washed and dried solid polyimide polymer was dissolved with thorough stirring in 15.06 g of cyclohexanone which had been dried over molecular sieves.

EXAMPLE 2

2,2-Bis(3,4-dicarboxyphenyl)hexafluoropropane dianhydride/2,2-bis[4-(4-aminophenoxy)phenyl]hexafluoropropane polyimide was produced as follows: 2,2-Bis(3,4-dicarboxyphenyl)hexafluoropropane dianhydride (20.261 g) was added to a stirred solution of 23.680 g of 2,2-bis[4-(4-aminophenoxy)phenyl]hexafluoropropane (99.85% purity) in 101.41 g of cyclohexanone (CH) over a 17-minute period while maintaining the temperature between 75° and 90° C. Stirring was effected by means of a double spiral agitator, and the system was kept under a dry nitrogen atmosphere. An additional 22.92 g of CH was used to rinse the anhydride into the diamine solution. The temperature was slowly raised to 159° C. over a period of 5 hours with stirring, and during this time 18.6 mL of distillate was recovered from the reaction vessel. The reaction mixture was then allowed to cool to room temperature. The polyimide (isolated by heating at 95° C. overnight at a pressure of 0.2 mm of mercury) so formed had an inherent viscosity of 0.32 dL/g as measured in NMP at room temperature (25° C.) at a polyimide concentration of 0.5 gram per deciliter. To a 51.05 g portion of the reaction mixture in CH was added 10.36 g of 1,2,3,4-tetramethylbenzene (TMB) and the resultant solution (solids content: 20%) was thoroughly stirred and filtered through a 0.2 micron filter using nitrogen pressure.

EXAMPLE 3

Using the same general procedure as in Example 2, a solution of the polyimide in cyclohexanone was produced by reacting approximately equimolar amounts of the dianhydride and diamine in cyclohexanone while raising the temperature of the reaction mixture to about 156° C. during a 3-hour period while removing the volatiles from the reaction zone as a distillate. After allowing the reaction solution to stand overnight at room temperature, an additional quantity of cyclohexanone was added, and the stirred mixture was heated slowly to 149° C., and then allowed to cool to room temperature. After filtration, the resultant product was diluted with 1,2,3,4-tetramethylbenzene (TMB) to form an 18% solids solution in a 81:19 mixture of cyclohexanone and TMB. The inherent viscosity of the polyimide (isolated by removing the solvents by heating at 95° C. overnight at a pressure of 0.2 mm of mercury) as measured in N-methylpyrrolidone at 25° C. at a polyimide concentration of 0.5 g/dL was 0.50 dL/g.

EXAMPLE 4

Spin coating tests were carried out in order to determine the behavior of different polyimide solutions under conditions of controlled relative humidity. The procedure employed in these tests involved use in a room of controllable humidity of a spin coater equipped with a rotatable vacuum chuck for holding the wafer in place in a horizontal position, and a fume exhaust system. Commercially available silicon wafers three inches in diameter were used as the substrates for the coatings. With the wafer held in a horizontal non-rotating position, a quantity of approximately three grams of coating solution was applied to the center of the wafer, and the wafer was then spun at 5000 rpm for one minute. During this time the wafer was subjected to visual observation to determine the characteristics of the coating. Coatings which develop a milky white appearance (precipitate formation) or which spin off pieces of coating are unsatisfactory. Satisfactory coatings show neither such defect; rather, they remain clear, smooth and uniform in appearance.

The results of these tests are summarized in the following table wherein NMP represents N-methylpyrrolidone, CH represents cyclohexanone, TMB represents 1,2,3,4-tetramethylbenzene, No PPT signifies that no precipitate formation occurred during the spin coating operation, and PPT signifies that precipitate formation occurred during the spin coating operation. The percentages shown for the solvent and solids (solids represents the concentration of the polyimide in the solvent) are on a weight basis, and the inherent viscosities shown (which are a measure of the molecular weights of the polyimide polymers) were measured in N-methylpyrrolidone at room temperature (25° C.) at a polyimide concentration of 0.5 g/dL, and are presented in terms of dL/g.

TABLE
Results of Spin Coating Operations

| Run No. | Solvent | Solids, % | Inherent Viscosity | Relative Humidity, % | Behavior During Spin |
|---|---|---|---|---|---|
| Comparative Compositions: | | | | | |
| 1 | 100% NMP | 19 | 1.00 | 30 | No PPT |
| 2 | 100% NMP | 19 | 1.00 | 40 | PPT |
| 3 | 100% NMP | 19 | 0.65 | 44–49 | PPT |
| 4 | 100% NMP | 12 | 0.65 | 44–49 | PPT |
| 5 | 35% NMP-65% CH | 12 | 0.65 | 44–49 | PPT |
| 6 | 60% NMP-40% CH | 19 | 0.65 | 44–49 | PPT |
| Compositions of this Invention: | | | | | |
| 7 | 90% CH-10% NMP* | 17 | 0.78 | 55 | No PPT |
| 8 | 100% CH | 16 | 0.78 | 48.5–50 | No PPT |
| 9 | 100% CH | 16 | 0.78 | 55 | No PPT |
| 10 | 81% CH-19% TMB* | 18 | 0.50 | 60 | No PPT |
| 11 | 60% CH-40% TMB* | 20 | 0.32 | 52–55 | No PPT |

*Solution was filtered before use — see Examples 1-3

The coated wafer from Run 11 was dried at 100° C. and then heated for 30 minutes at 350° C. The resultant baked coating was 1.9 microns thick.

While the compositions of this invention are well adapted for use in spin coating applications, they may be used for other purposes, such as in formation of coatings by spray coating or immersion techniques, formation of films by solvent casting procedures, formation of composites by impregnation, and the like.

The foregoing disclosure has been presented for purposes of illustration and not limitation. As can readily be appreciated by those skilled in the art, this invention is susceptible to considerable variation in its practice within the spirit and scope of the ensuing claims.

What is claimed is:

1. A partially fluorinated polyimide composition especially adapted for use in spin coating wafers of semiconductive materials which composition comprises a solution of (i) a 2,2-bis(3,4-dicarboxyphenyl)hexafluoropropane dianhydride/2,2-bis[4-(aminophenoxy)phenyl]hexafluoropropane polyimide polymer having an inherent viscosity in the range of about 0.05 to about 1.5 dL/g (as measured in N-methylpyrrolidone at room temperature at a concentration of 0.5 g/dL) in (ii) a liquid solvent containing at least 90% of a cycloaliphatic ketone or mixture of cycloaliphatic ketones, such that said solution (a) contains on a weight basis from about 5% to about 50% of such polyimide, and (b) does not undergo precipitate formation during spin coating in an atmosphere of up to at least about 55% relative humidity.

2. A composition of claim 1 wherein the solvent is essentially 100% cycloaliphatic ketone.

3. A composition of claim 1 wherein the solvent additionally contains a small proportion of co-solvent that does not, in the concentration employed, cause the solution to undergo precipitate formation during spin coating in an atmosphere of up to at least about 55% relative humidity.

4. A composition of claim 1 wherein the 2,2-bis[4-(aminophenoxy)phenyl]hexafluoropropane of said polyimide is 2,2-bis[4-(4-aminophenoxy)phenyl]hexafluoropropane and the solvent consists essentially of one or more cycloparaffinic ketones.

5. A composition of claim 4 wherein the solvent is essentially 100% cycloparaffinic ketone.

6. A composition of claim 4 wherein the solvent is essentially 100% cyclohexanone.

7. A composition of claim 4 wherein the solvent additionally contains a small proportion of co-solvent that does not, in the concentration employed, cause the solution to undergo precipitate formation during spin coating in an atmosphere of up to at least about 55% relative humidity.

8. A composition of claim 4 wherein the solvent additionally contains a small proportion of a dipolar aprotic solvent that does not, in the concentration employed, cause the solution to undergo precipitate formation during spin coating in an atmosphere of up to at least about 55% relative humidity.

9. A composition of claim 8 wherein the dipolar aprotic solvent is N-methylpyrrolidone.

10. A composition of claim 4 wherein the solvent additionally contains one or more aromatic hydrocarbon solvents that do not, in the concentration employed, cause the solution to undergo precipitate formation during spin coating in an atmosphere of up to at least about 55% relative humidity.

11. A composition of claim 10 wherein the boiling point of the one or more aromatic hydrocarbon solvents is at least about 110° C.

12. A composition of claim 10 wherein the aromatic hydrocarbon solvent is at least one tetramethylbenzene isomer.

13. A composition of claim 10 wherein the aromatic hydrocarbon solvent is essentially 1,2,3,4-tetramethylbenzene.

14. A composition of claim 1 wherein said solution contains on a weight basis from about 10% to about 35% of such polyimide.

15. A composition of claim 1 wherein the inherent viscosity of the polyimide as measured at a concentration of 0.5 g/dL in N-methylpyrrolidone at 25° C. is in the range of about 0.1 to about 0.9 dL/g.

16. A composition of claim 1 wherein said solution contains on a weight basis from about 10% to about 35% of such polyimide, and wherein the inherent viscosity of the polyimide as measured at a concentration of 0.5 g/dL in N-methylpyrrolidone at 25° C. is in the range of about 0.1 to about 0.9 dL/g.

17. A composition of claim 16 wherein the solvent is essentially 100% cycloaliphatic ketone.

18. A composition of claim 16 wherein the solvent additionally contains a small proportion of co-solvent that does not, in the concentration employed, cause the solution to undergo precipitate formation during spin coating in an atmosphere of up to at least about 55% relative humidity.

19. A composition of claim 16 wherein the 2,2-bis[4-(aminophenoxy)phenyl]hexafluoropropane of said polyimide is 2,2-bis[4-(4-aminophenoxy)phenyl]hexafluoropropane and the solvent consists essentially of one or more cycloparaffinic ketones.

20. A composition of claim 19 wherein the solvent is essentially 100% cycloparaffinic ketone.

* * * * *